(12) United States Patent
Patwardhan

(10) Patent No.: US 11,711,993 B2
(45) Date of Patent: Aug. 1, 2023

(54) SHIFTABLE WHEELS FOR AGRICULTURAL IMPLEMENTS

(71) Applicant: Great Plains Manufacturing, Inc., Salina, KS (US)

(72) Inventor: Ranjit Patwardhan, Hesston, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 587 days.

(21) Appl. No.: 16/811,080

(22) Filed: Mar. 6, 2020

(65) Prior Publication Data

US 2021/0274699 A1 Sep. 9, 2021

(51) Int. Cl.
  *A01B 63/16* (2006.01)
  *A01C 7/08* (2006.01)
  *A01C 7/20* (2006.01)
  *B62D 49/06* (2006.01)

(52) U.S. Cl.
  CPC ............ *A01B 63/163* (2013.01); *A01C 7/088* (2013.01); *A01C 7/208* (2013.01); *B62D 49/0678* (2013.01)

(58) Field of Classification Search
  CPC ....... A01C 7/208; A01C 7/088; A01B 63/163; A01B 63/026
  USPC ......................................... 172/406, 281, 212
  See application file for complete search history.

(56) References Cited

U.S. PATENT DOCUMENTS

| 1,783,009 | A | * | 11/1930 | Cook | E02F 3/764 |
| | | | | | 172/788 |
| 4,241,674 | A | * | 12/1980 | Mellinger | A01C 5/06 |
| | | | | | 111/59 |
| 4,308,811 | A | * | 1/1982 | Bass | A01C 11/00 |
| | | | | | 111/112 |
| 4,677,922 | A | * | 7/1987 | Shrull | A01B 49/06 |
| | | | | | 172/451 |
| 5,685,245 | A | * | 11/1997 | Bassett | A01B 79/005 |
| | | | | | 172/683 |
| 6,182,770 | B1 | * | 2/2001 | Pickett | A01B 35/28 |
| | | | | | 172/177 |
| 6,880,644 | B2 | * | 4/2005 | Weast | A01B 63/26 |
| | | | | | 172/570 |
| 7,249,534 | B1 | * | 7/2007 | Devenyi | F16H 25/2295 |
| | | | | | 74/424.94 |
| 9,155,241 | B2 | * | 10/2015 | Rans | A01C 19/02 |
| 9,775,274 | B2 | * | 10/2017 | Steinlage | A01B 15/16 |
| 10,051,783 | B2 | * | 8/2018 | Bruer | A01B 63/004 |
| 2002/0144830 | A1 | * | 10/2002 | Steinlage | A01B 15/025 |
| | | | | | 172/538 |
| 2008/0168852 | A1 | * | 7/2008 | Chen | F16H 25/2472 |
| | | | | | 74/89.23 |

(Continued)

*Primary Examiner* — Jamie L McGowan
(74) *Attorney, Agent, or Firm* — Hovey Williams LLP; Kameron D. Kelly

(57) ABSTRACT

A wheel assembly for an agricultural implement. The agricultural equipment includes a laterally-extending toolbar with one or more agricultural tools extending from the toolbar. The wheel assembly comprises a wheel configured to rotate along a ground surface. The wheel assembly additionally comprises a base bracket configured to be rigidly secured to the toolbar. The wheel assembly further comprises a wheel bracket adjustably engaged with the base bracket. Adjustment of the wheel bracket with respect to the base bracket causes a corresponding lateral shifting of the wheel with respect to the toolbar.

12 Claims, 14 Drawing Sheets

(56) References Cited

U.S. PATENT DOCUMENTS

| | | | |
|---|---|---|---|
| 2010/0059238 A1* | 3/2010 | Kovach | A01C 7/203 |
| | | | 172/570 |
| 2015/0223390 A1* | 8/2015 | Wendte | A01C 7/10 |
| | | | 111/177 |
| 2017/0303464 A1* | 10/2017 | Sivinski | A01C 5/064 |
| 2018/0271020 A1* | 9/2018 | Kovach | A01D 67/005 |
| 2018/0317367 A1* | 11/2018 | Kovach | A01B 63/145 |
| 2019/0053420 A1* | 2/2019 | Bates | A01C 21/00 |
| 2021/0274699 A1* | 9/2021 | Patwardhan | A01B 63/163 |

* cited by examiner

SHIFTABLE WHEELS FOR AGRICULTURAL IMPLEMENTS

FIELD OF THE INVENTION

The present invention relates to agricultural implements. More particularly, embodiments of the present invention relate to agricultural implements that include wheels that can have their positions shifted, such as laterally, with respect to components of the agricultural implements.

BACKGROUND OF THE INVENTION

Agricultural implements can be used to perform various agricultural operations. For example, planters may be used to deposit seed or treatment in and/or on the ground. Tillage implements may be used to perform tilling operations on the ground. Often such implements will be propelled (e.g., pulled) along the ground by a tow vehicle (e.g., a tractor). As such, the implements will generally include wheels that support the implements on the ground as the implements are propelled through a field by the tow vehicle. In some situations, it would be beneficial to shift a position of one or more of the wheels of an agricultural implement laterally with respect to a frame of the agricultural implement. However, previous agricultural implements required the wheels to be removed from the frame before such a shifting could occur. Removal, shifting, and re-attachment of the wheels is a time-consuming and labor-intensive undertaking.

SUMMARY OF THE INVENTION

One embodiment of the present invention includes a wheel assembly for an agricultural implement. The agricultural equipment includes a laterally-extending toolbar with one or more agricultural tools extending from the toolbar. The wheel assembly comprises a wheel configured to rotate along a ground surface. The wheel assembly additionally comprises a base bracket configured to be rigidly secured to the toolbar. The wheel assembly further comprises a wheel bracket adjustably engaged with the base bracket. Adjustment of the wheel bracket with respect to the base bracket causes a corresponding lateral shifting of the wheel with respect to the toolbar.

In another embodiment of the present invention, there is provided a method of transitioning a planter from a twin row configuration to a single row configuration. The method may comprise a step of providing the planter in the twin row configuration. The planter comprises a laterally-extending toolbar with a plurality of pairs of row units positioned along and coupled with the toolbar. The planter additionally comprises one or more wheels for supporting the planter on the ground. In the twin row configuration, each of the row units from the pairs of row units is configured to deposit seed. In the single row configuration, a first of the row units from each of the pairs of row units is configured as a non-operational row unit that is configured to not deposit seed, and a second of the row units from each of the pairs of row units is configured as an operational row unit configured to deposit seed. An additional step of the method includes configuring one of the row units from each of the pairs of row units as a non-operational row unit. An additional step of the method includes laterally shifting the toolbar. The laterally shifting step includes laterally shifting the pairs of row units coupled with said toolbar. A further step of the method includes, before or after the shifting of the lateral toolbar, laterally shifting the wheels with respect to the toolbar.

In another embodiment of the present invention, there is provided an agricultural implement comprising a laterally-extending toolbar, one or more tools extending from the toolbar, and a wheel assembly. The wheel assembly comprises a wheel configured to support the toolbar on the ground, a base bracket rigidly secured to the toolbar, and a wheel bracket adjustably engaged with the base bracket. Adjustment of the wheel bracket with respect to the base brackets is configured to cause a corresponding lateral shifting of the wheel with respect to the toolbar.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1:
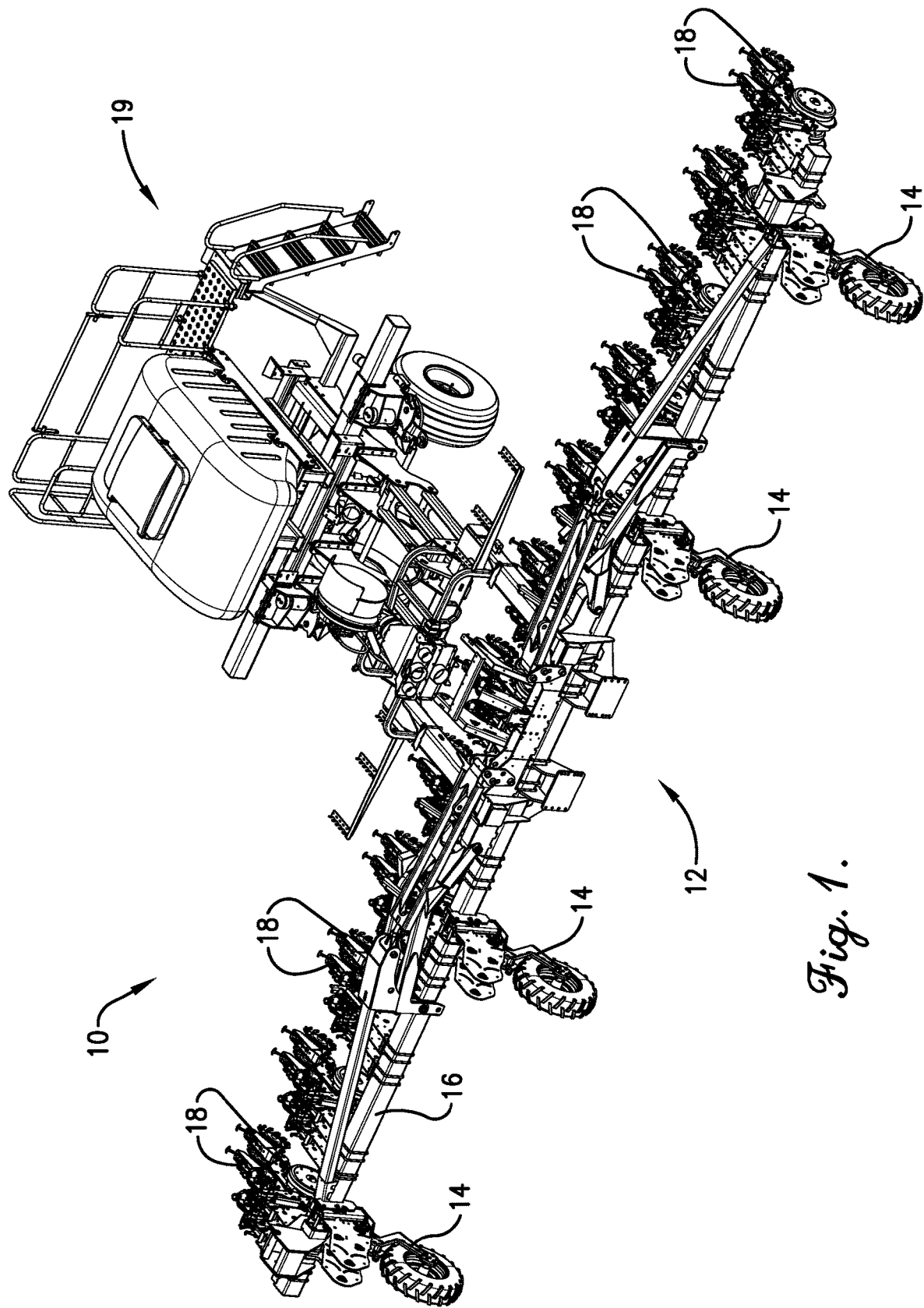
FIG. 1 is a front perspective view of an agricultural implement according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
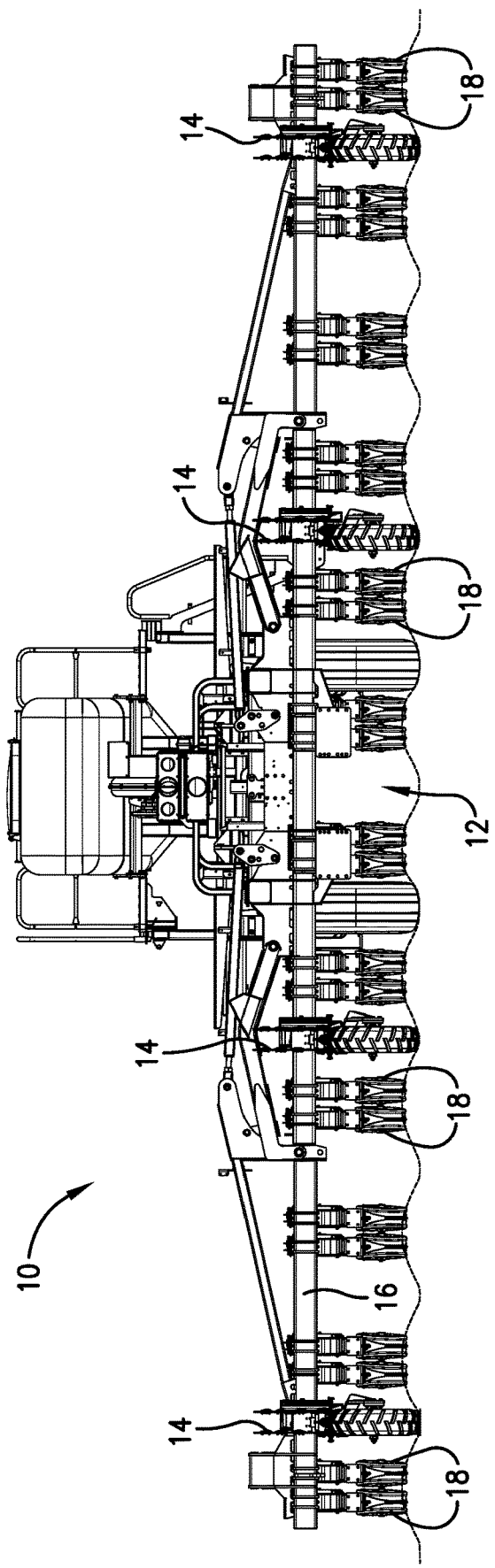
FIG. 2 is a front elevation view of the agricultural implement from FIG. 1, positioned on a field comprising a plurality of raised beds separated from each other by troughs, with the agricultural implement configured in a twin row configuration.

Embodiments of the present invention are directed to an agricultural implement that includes one or more shiftable wheels. The agricultural implements incorporating embodiments of the present invention may include various types of implements, such as planters, tillers, or the like. For example, as illustrated in FIGS. 1 and 2, an agricultural implement incorporating the principles of the present invention is illustrated as a planter 10. The planter 10 may be pulled across a field so as to deposit seed or treatment through the field. The planter 10 may be pulled by a towing vehicle (not shown), such as a tractor. Broadly speaking, and with reference to FIGS. 1 and 2, the planter 10 comprises a main frame 12 supported above a ground surface by one or more wheel assemblies 14. The main frame 12 may include a laterally-extending toolbar 16 configured to carry a plurality of agricultural tools, such as ground-engaging tools in the form of row units 18. The planter 10 may be a twin row planter configured to carry a plurality of pairs of row units 18 on the toolbar 16. However, as will be discussed below, the planter 10 may be shifted between a twin row configuration and a single row configuration.

The row units 18 may be planting units configured to deposit seed or treatment into and/or on the ground. As such, the row units 18 may each comprise one or more opening mechanism (e.g., disc blades) for creating a furrow in the ground, a seed tube for dispensing seed or treatment into or onto the ground (e.g., into the furrow), one or more closing mechanisms for closing filling in and/or covering the furrow with soil, and/or one or more firmer mechanisms (e.g., firming wheels) for firming the ground in which the seeds were deposited. The row units 18 may be associated with lifting mechanism (e.g., hydraulic cylinders) configured to raise and lower the row units 18 with respect to the ground. When a row unit 18 is raised away from the ground, the row unit 18 may be configured in a non-operating configuration, such that the row unit 18 is not configured to deposit seed into or on the ground. In contrast, when a row unit 18 is lowered to a position adjacent to and/or engaged with the ground, the row unit 18 may be in an operating configuration, such that the row unit 18 is configured to deposit seed into or on the ground. The lifting mechanisms of the row units 18 may also be used to apply a specified down force to the row units 18, such that the row units 18 remain appropriately engaged with the ground during operation.

The wheel assemblies 14 may also be secured to and extend downward from the toolbar 16. For example, the wheel assemblies 14 may each comprise a coupling assembly configured to secure the wheel assembly 14 to the toolbar 16 and a wheel configured to rotate along a surface of the ground, as will be described in more detail below. Finally, in some embodiments, the planter 10 may include one or more additional attachments, such as a bin 19 shown in FIG. 1, which is connected to the main frame 12 in a manner that permits the bin 19 to be pulled behind the main frame. For example, the bin 19 may be configured to hold seed that can be distributed to the row units 18 which can deposit the seed in and/or on the ground.

Directional terms used in the following specification, such as the terms "front/forward," "back/rear/rearward," "left," and "right," are given from the viewpoint of one standing at the rear of the planter 10 looking forward. As such, for example, the bin 19 of the planter 10 is attached to a rear of the main frame 12 of the planter 10, and the tow vehicle (not shown) would be configured to be coupled to a front of the planter 10 to pull the planter 10 through a field in a travel direction, i.e., a leftward/downward direction with reference to FIG. 1. As used herein, the term "longitudinal" will generally refer to a forward and/or rearward direction with respect to the planter 10. As such, the longitudinal direction is generally parallel with the travel direction. In contrast, the term "lateral" will generally refer to a rightward and/or leftward direction with respect to the planter 10. As such, the lateral direction is generally perpendicular with the travel direction.

Figure 3:
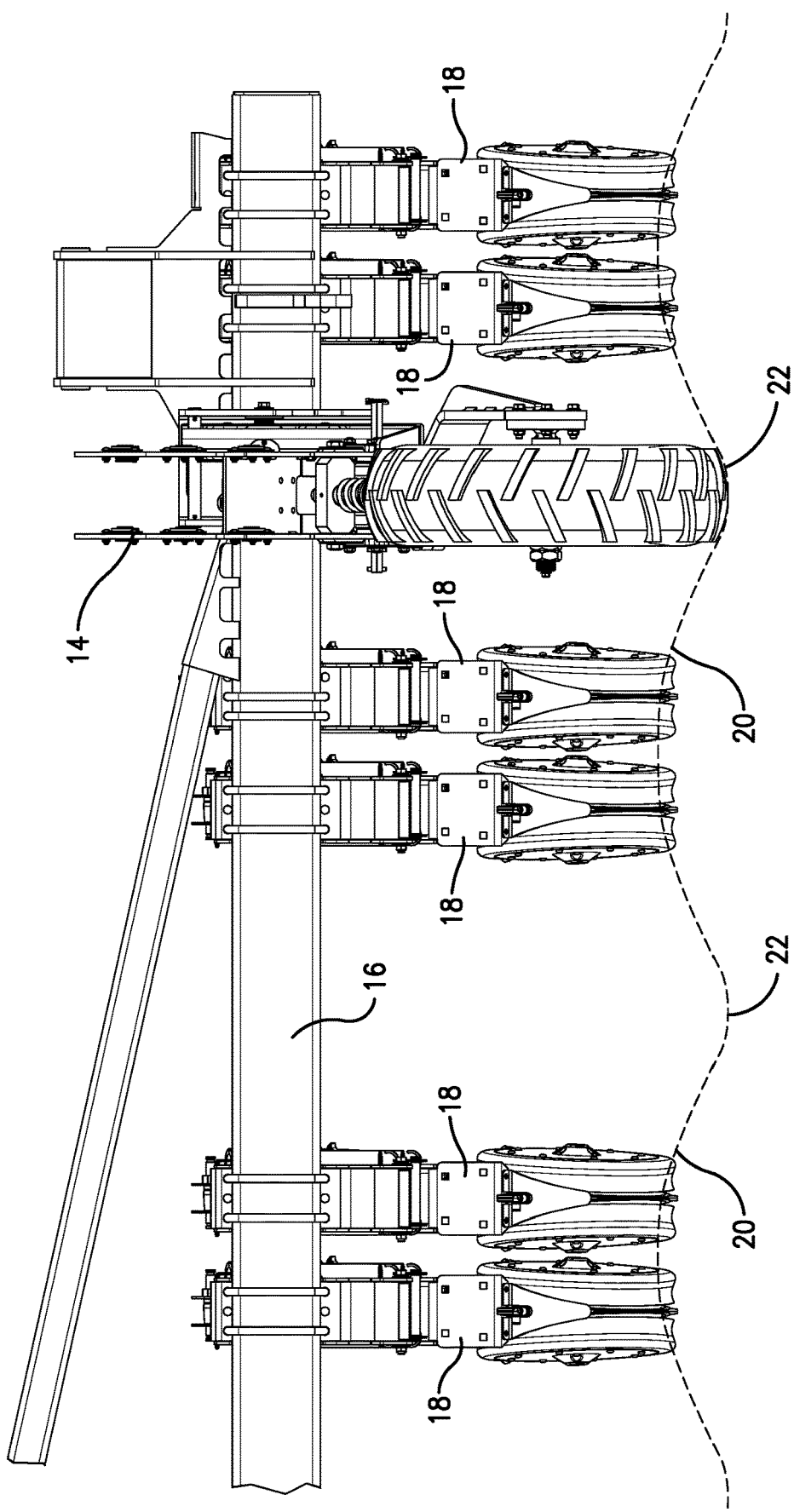
FIG. 3 is an enlarged front elevation view of a right side of the agricultural implement from FIG. 2.

In some embodiments, the row units 18 of the planter 10 may be configured in a twin row configuration or a single row configuration. FIGS. 2 and 3 illustrate the row units 18 of the planter in twin row configuration. As illustrated, when the row units 18 are in a twin row configuration, the row units 18 are generally positioned in pairs such that two individual row units 18 are positioned adjacent to one another. In the twin row configuration, each of the row units 18 from the pairs of row units is configured in an operational configuration so as to deposit seed into or on the ground. Such positioning is beneficial for certain types of crop, such as soybean, in which it is beneficial for seed to be deposited on both sides of a raised bed or mound to increase yield.

In more detail, and with reference to FIG. 3, a field may be configured as a plurality of generally parallel rows of raised beds 20, with each adjacent pair of beds 20 separated by a trough 22. As such, the beds 20 may be shaped as mounds. When the planter 10 is in the twin row configuration, a pair of row units 18 is generally positioned above each of the beds 20. As such, each pair of row units 18 is spaced apart from an adjacent pair of row units by a distance related to the width of the trough 22. In such a configuration, a pair of row units 18 is configured to deposit seed in and/or on a given bed 20, with one individual row unit 18 configured to deposit seed on one side of the peak or pinnacle of the bed 20 and the other individual row unit 18 configured to deposit seed on the other side of the peak or pinnacle of the bed 20.

With the row units 18 in a twin row configuration, the wheels of the wheel assemblies 14 will generally be positioned in alignment with the troughs 22. For instance, as illustrated in FIG. 3, the wheel of the wheel assembly 14 may be centered on the troughs 22, such that a central portion of the wheel contacts a center (or a bottom) of a trough 22. Such central positioning of the wheels of the wheel assemblies 14 on the troughs 22 aids the planter 10 in travelling along a generally straight direction (i.e., in alignment with the beds 20 and troughs 22) through the field. Such traversal of the planter 10 is also stable, whereas if the wheels were positioned on the beds 20, the planter's 10 position may be prone to shift laterally (e.g., the wheels sliding/falling down the sides of the beds 20) as the planter 10 traverses the field. The wheels being driven over the beds 20 (or a portion of the beds 20) can also deform the beds 20, which can be problematic for proper plant growth.

Figure 4:
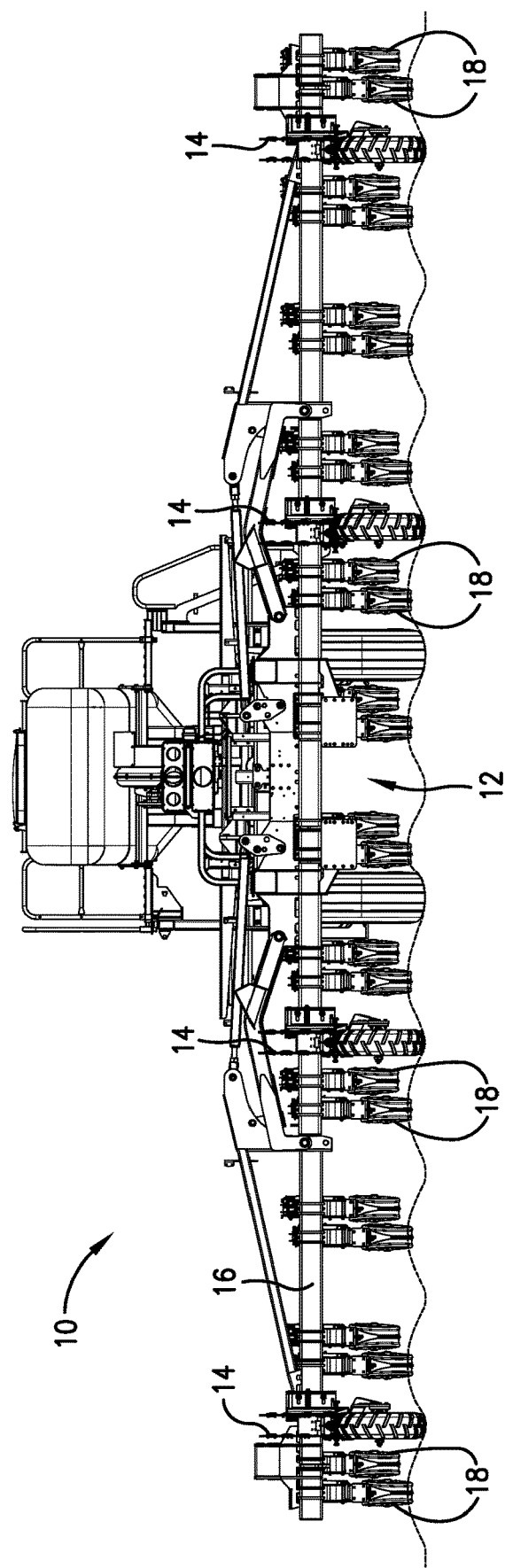
FIG. 4 is a front elevation view of the agricultural implement from FIG. 1, positioned on a field comprising a plurality of raised beds separated from each other by troughs, with the agricultural implement configured in a single row configuration.
Figure 5:
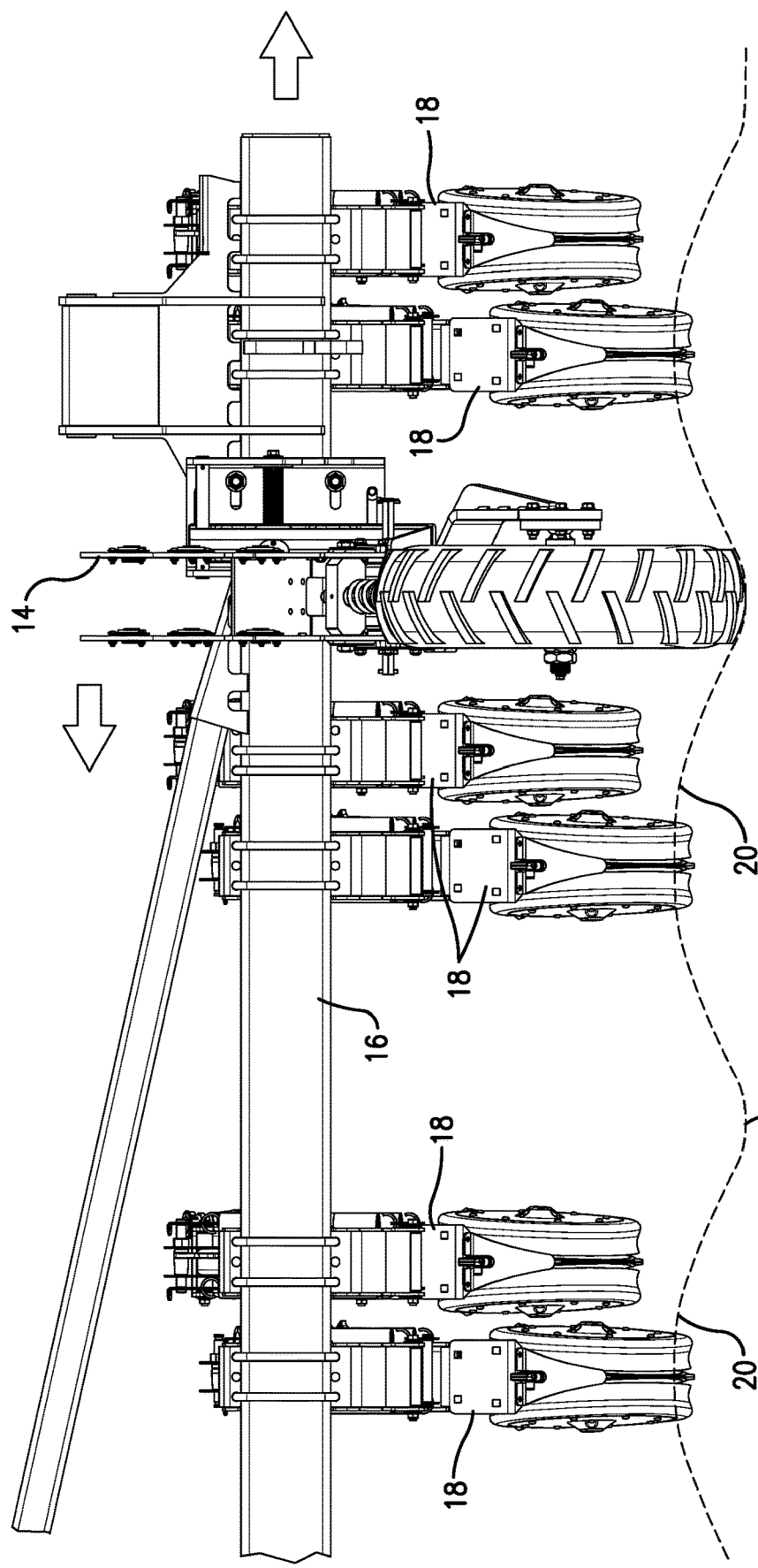
FIG. 5 is an enlarged front elevation view of a right side of the agricultural implement from FIG. 4.

The row units of the planter 10 may be transitioned from the twin row configuration to the single row configuration, as illustrated in FIGS. 4 and 5. In the single row configuration, one of the row units 18 (i.e., a raised row unit 18) from each of the pairs of row units 18 may be raised upward, away from the ground such that the raised row unit 18 will not be used for planting operations. The other of the row units (i.e., a lowered row unit 18) from each of the pairs of row units 18 will be positioned downward, adjacent to the ground such that the lowered row unit 18 can be used for planting operations. In the single row configuration, the raised row units 18 are configured as a non-operational row unit 18 that are configured to not deposit seed into or on the ground. In contrast, the lowered row units 18 are configured as operational row unit 18 configured to deposit seed into or on the ground. It is beneficial for certain type of planting operations, such as cotton planting operations, to use a single row configuration. When in the single row configuration, it is generally preferable beneficial for the lowered row unit 18 to be positioned in general alignment with a peak and/or pinnacle of one of the beds 20 (i.e., centered above one of the mounds). To accomplish such alignment, the toolbar 16 to which the row units 18 are coupled may be shifted laterally so as to laterally shift the position each of the lowered units 18 directly above the peak or pinnacle of one of the beds 20, as is illustrated in FIGS. 4 and 5.

However, upon the lateral shifting of the toolbar 16 and/or the row units 18, the wheels of the wheel assemblies 14 (which are also coupled with the toolbar 16) will have also been shifted laterally. Unfortunately, such lateral shifting of the wheels of the wheel assemblies 14 will bring the wheels out of alignment with the troughs 22, i.e., such that a central portion of each wheel is misaligned and/or no longer contacts the center (or the bottom) of a trough 22. Such misalignment can be problematic for proper maneuvering of the planter and for maintaining proper shape of the field (i.e., the proper shape of the beds 20 and troughs 22). Beneficially, embodiments of the present invention provide for the wheel assemblies 14 to be configured so as to permit the wheels to be laterally shifted with respect to the main frame 12 and/or the toolbar 16 of the planter 10, such that the wheels can be properly aligned with the troughs 22. As such, the wheels 30 may be aligned with the troughs 22 and positioned generally evenly between a pair of adjacent beds 20 when the planter 10 is in either the twin row configuration or the single row configuration.

Figure 6:
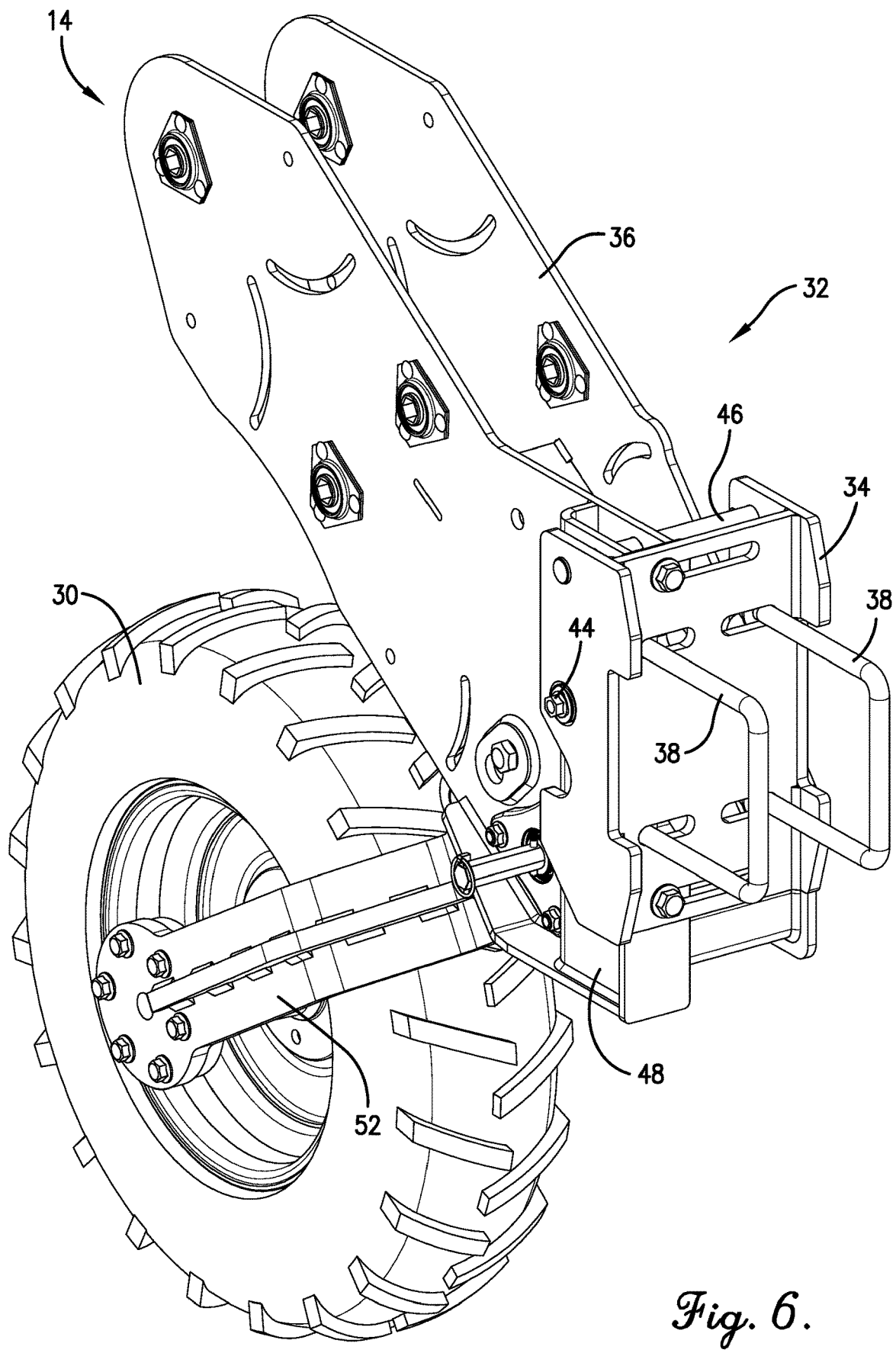
FIG. 6 is a rear perspective view of a wheel assembly from the agricultural implement of FIG. 1, with the wheel assembly including a base bracket, a wheel bracket, and a wheel.

In more detail, a wheel assembly 14 configured according to embodiment of the present invention is illustrated in FIG. 6 and comprises a wheel 30 configured to rotate along a ground surface and an coupling assembly 32 configured to secure the wheel 30 to the toolbar 16 of the main frame 12 of the planter 10. The coupling assembly 32 may comprise a base bracket 34 configured to be rigidly secured to the toolbar 16, and a wheel bracket 36 adjustably engaged with the base bracket 34. The coupling assembly 32 is particularly configured such that a lateral shifting of the wheel bracket 36 with respect to the base bracket 34 will cause a corresponding lateral shifting of the wheel 30 with respect to the toolbar 16, as will be discussed in more detail below.

Figure 7:
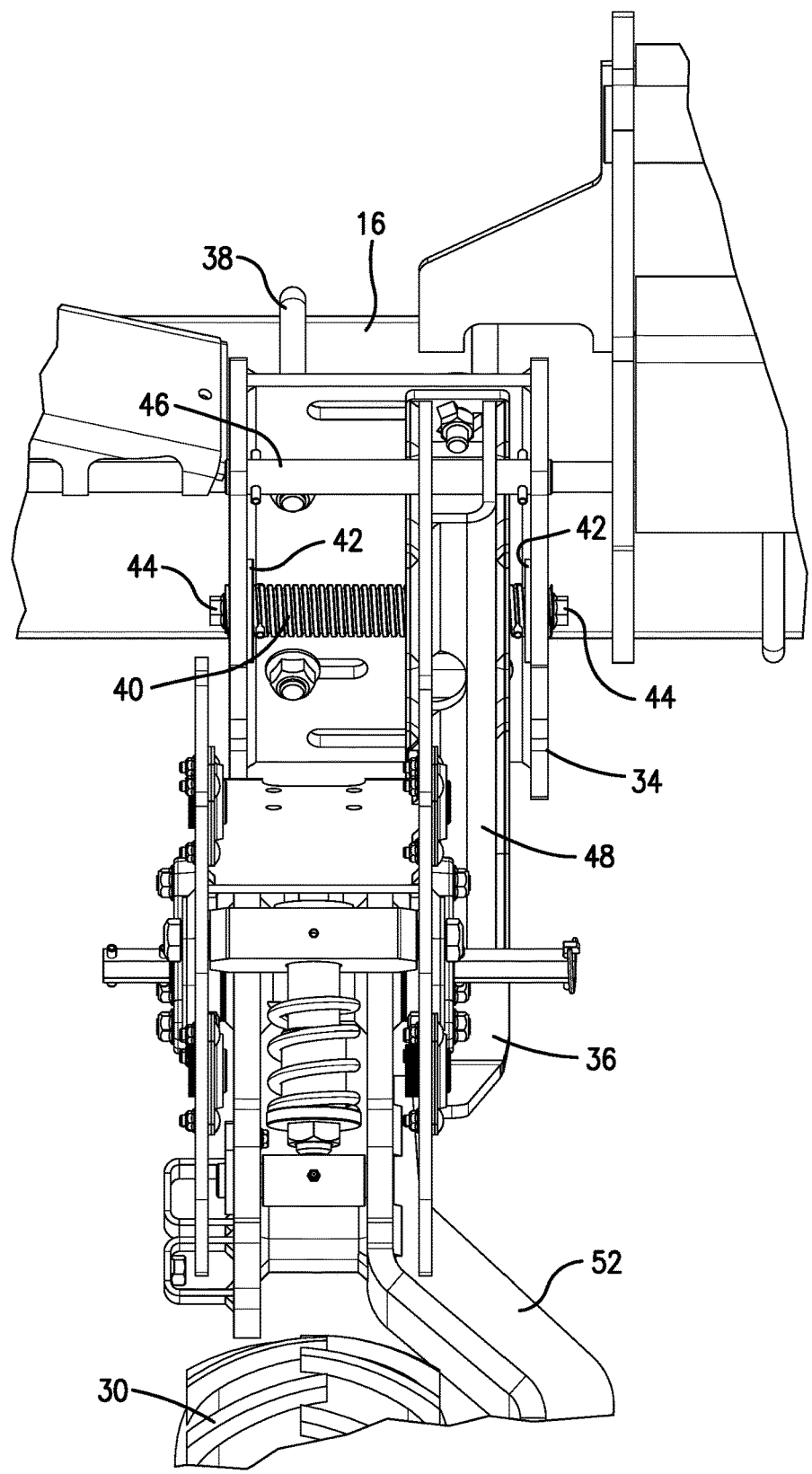
FIG. 7 is a front perspective view of a portion of the wheel assembly from FIG. 6 coupled with a toolbar of an agricultural implement, particularly illustrating the wheel bracket shiftably engaged with the base bracket.
Figure 8:
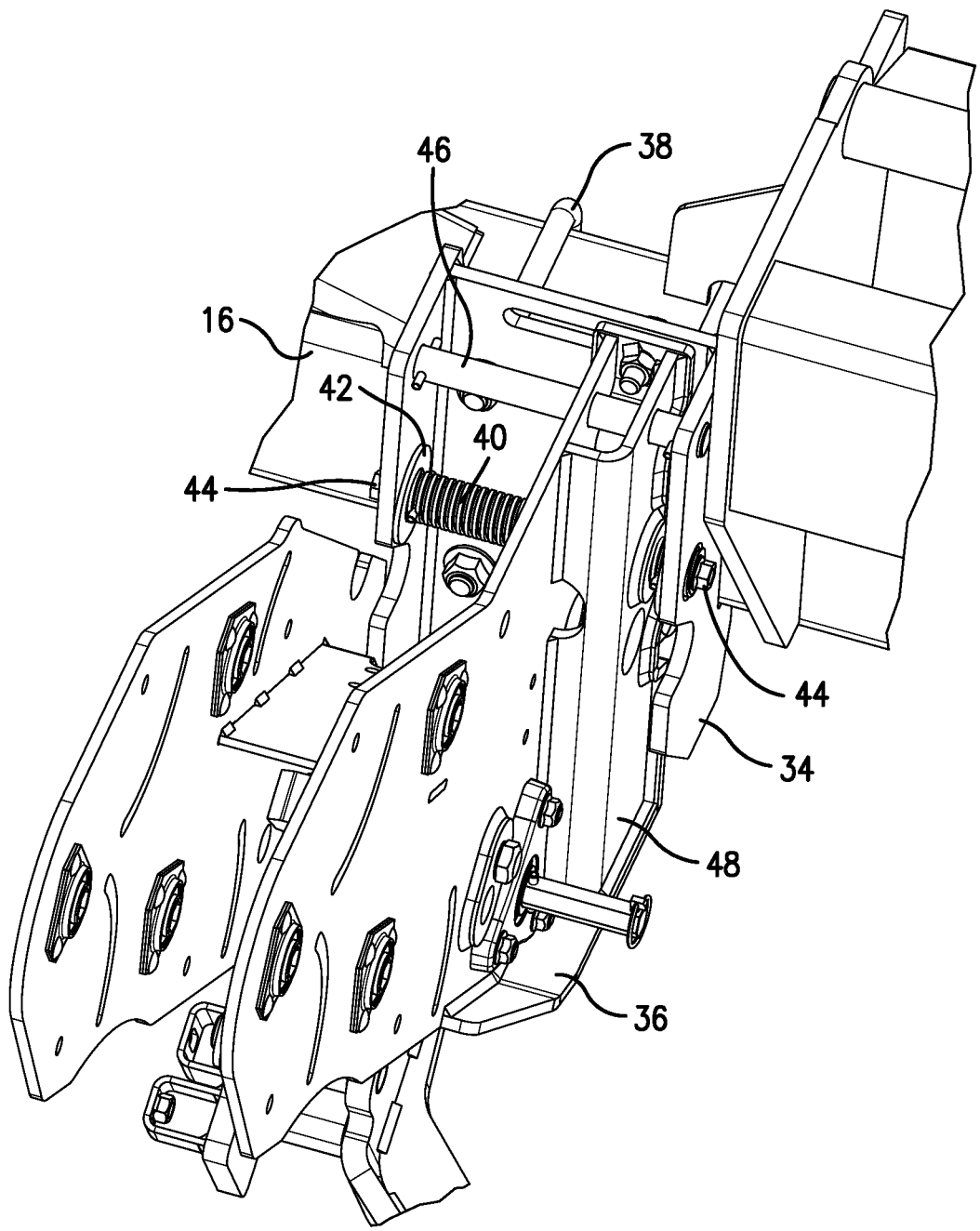
FIG. 8 is another front perspective view of a portion of the wheel assembly from FIG. 7.

With reference to FIGS. 6-8, the base bracket 34 may comprise a frame with a back portion and pair of spaced apart side portions that extend forward from the back portion. The base bracket 34 may be rigidly secured to the toolbar 16 via one or more U-bolts 38 (See FIG. 6) configured to wrap around the toolbar 16 and securely engage with the back portion of the base bracket 34. The base bracket 34 is shown rigidly secured to the toolbar 16 in FIGS. 7 and 8. Remaining with FIGS. 7 and 8, the base bracket 34 may comprise a laterally extending threaded leadscrew 40 secured to the frame and extending between the pair of side portions of the frame. In some embodiments, the leadscrew 40 will be rotationally coupled with the frame, such that the leadscrew is free to rotate about a longitudinal axis of the leadscrew 40. In particular, the leadscrew 40 may comprise a body with an externally threaded surface that extends between the side portions of the frame. The body may be coupled to the side portions of the frame via bearings 42 positioned between the body and the side portions of the frame (e.g., one bearing on each side portion of the frame), so as to permit the leadscrew 40 to rotate with respect to the frame. The leadscrew 40 may additionally comprise heads 44 (e.g., hexagonal-shaped heads) positioned on both ends of the body of the leadscrew 40. As shown in FIGS. 7 and 8, the heads 44 may be positioned on outer surfaces of the side portions of the frame, so as to facilitate access to the heads 44. As configured, the heads 44 can be rotated (e.g., via wrench or other tool) so as to cause a corresponding rotation of the body of the leadscrew 40.

The base bracket 34 may also comprise a guide element 46 extending between the side portions of the frame. The guide element 46 may comprise a cylindrical rod space apart from the leadscrew 40 (e.g., vertically above or below the leadscrew 40).

Figure 9:
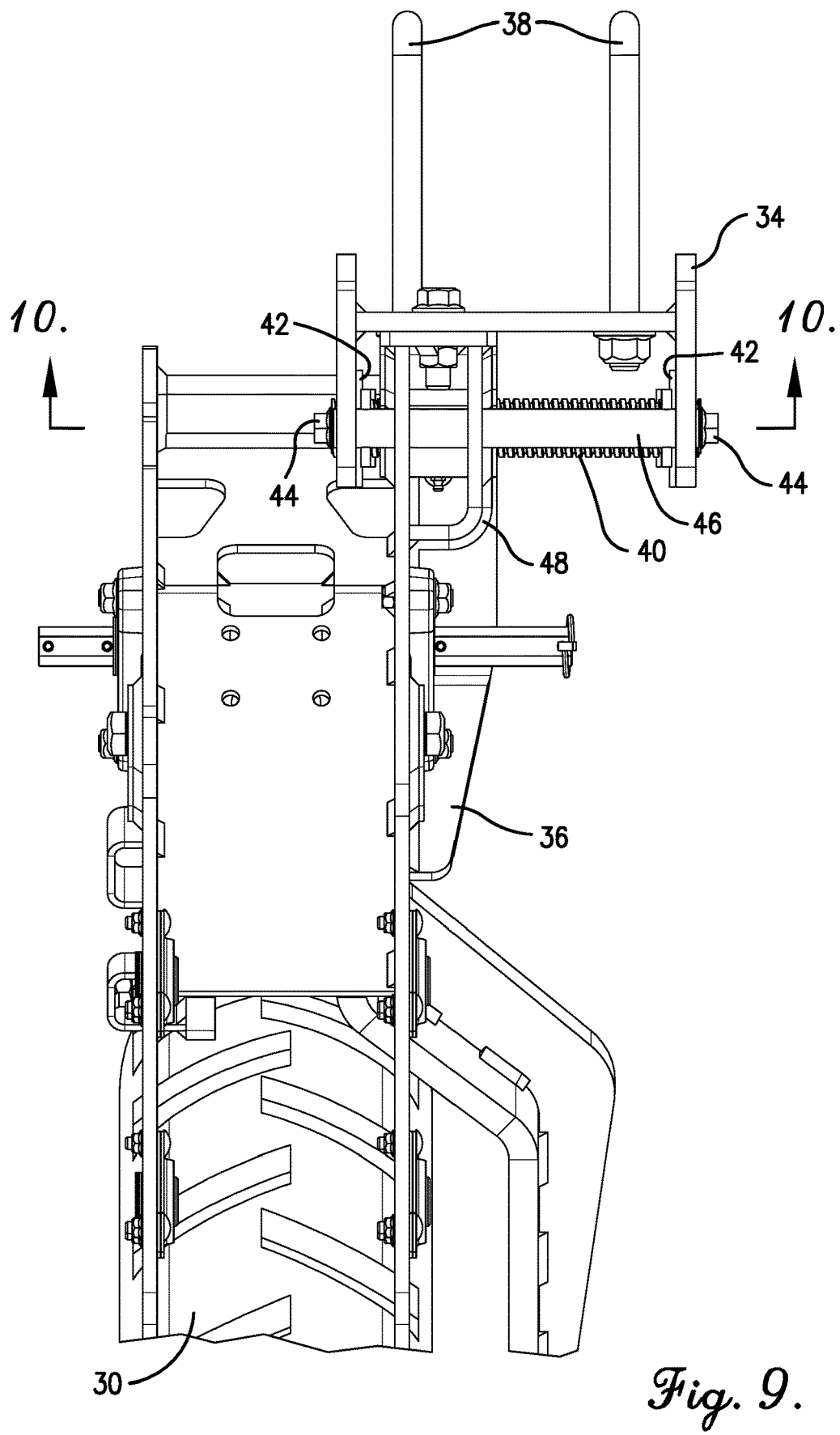
FIG. 9 is a top plan view of a portion of the wheel assembly from FIGS. 7 and 8 removed from the toolbar, and with the wheel bracket having been laterally shifted with respect to the base bracket.
Figure 10:
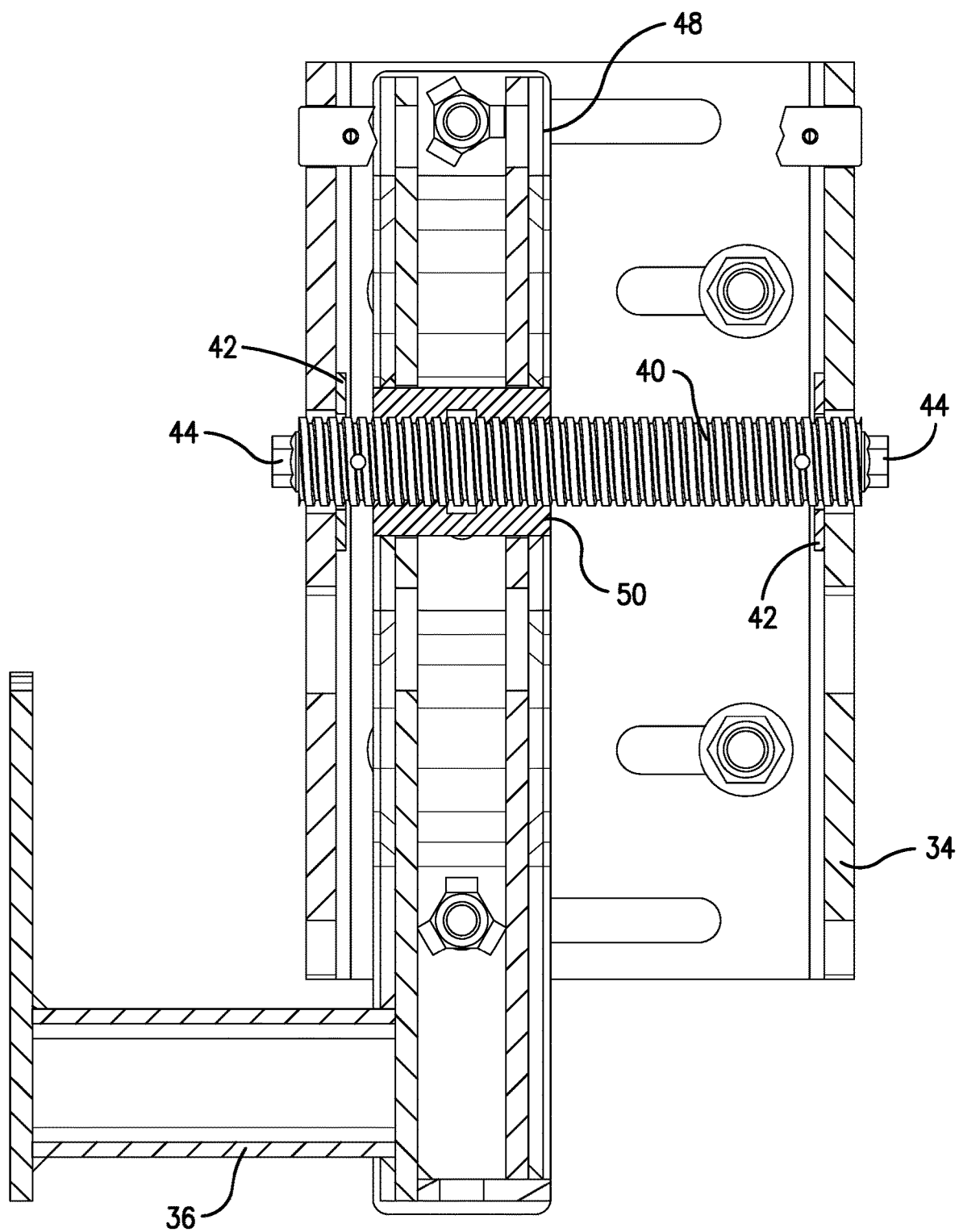
FIG. 10 is a cross-section taken along the line 10-10 from FIG. 9.

The wheel bracket 36 may comprise a base and an attachment portion 48, such as a plate (or a pair of laterally spaced plates), that extends upward from the base. As perhaps best illustrated by FIGS. 7-9, the attachment portion 48 may comprise a pair of spaced apart plates. In some embodiments, the spaced apart plates of the attachment portion 48 may be interconnected via a connection piece. The connection piece may, for example, be a portion of one of the laterally spaced plates that is bent so as to contact and be secured (e.g., via weld) to the other plate. Regardless, the attachment portion 48 may include a plurality of laterally extending through-holes that extend therethrough (e.g., through the laterally spaced plates). For example, the attachment portion 48 may include an upper through-hole through which the guide element 46 of the base bracket 34 may extend. The attachment portion 48 may also include a lower through-hole through which the leadscrew 40 of the base bracket 34 may extend. As perhaps best illustrated in FIG. 10, the attachment portion 48 may include a receiver element 50 positioned within the lower through-hole and configured to receive the leadscrew 40. The receiver element 50 may comprise a threaded interior portion (i.e., internal threads) configured to engage with the threads of the leadscrew 40. The receiver element 50 is rigidly engaged within the lower through-hole of the attachment portion 48, such that rotation of the leadscrew 40 will cause the attachment portion 48 (and the entirety of the wheel bracket 36) to shift its position along a length of the leadscrew 40. Because the base bracket 34 will generally be secured to the toolbar 16 in a manner that provides for the leadscrew 40 to be orientated and/or extend laterally, rotation of the leadscrew 40 will cause the attachment portion 48 (and the entirety of the wheel bracket 36) to shift laterally with respect to the base bracket 34 and the toolbar 16.

Finally, as perhaps best illustrated by FIG. 6, the wheel bracket 36 may include a support arm 52 rigidly coupled with and extending downward from the base of the wheel bracket 36. The support arm 52 is configured to rotatably couple with the wheel 30 of the wheel assembly 14. A bottom portion of the support arm 52 may present an axle and/or a rotation axis about which the wheel 30 can rotate.

Figure 11:
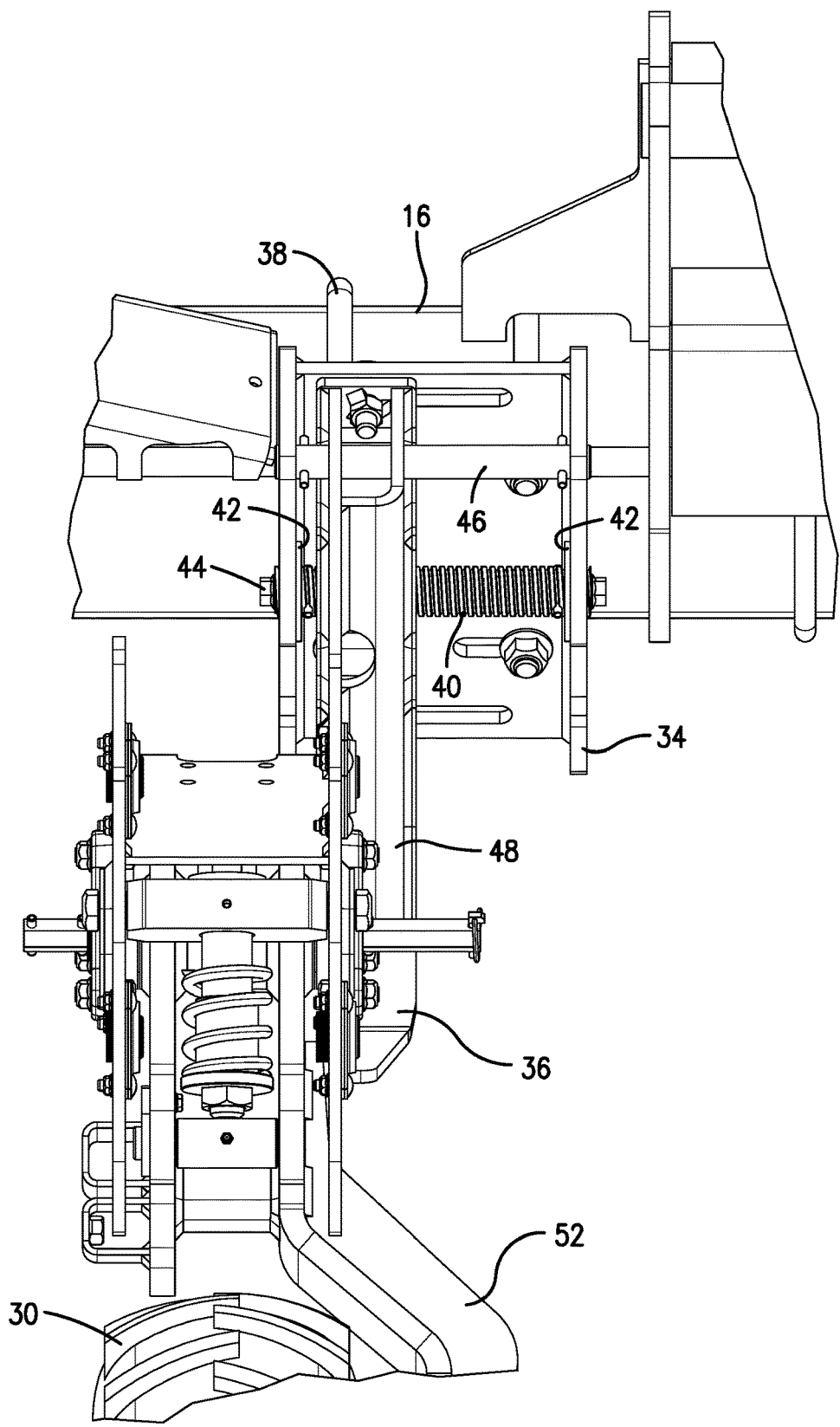
FIG. 11 is another front perspective view of a portion of the wheel assembly from FIGS. 7 and 8, particularly illustrating the wheel bracket having been laterally shifted with respect to the base bracket.
Figure 12:
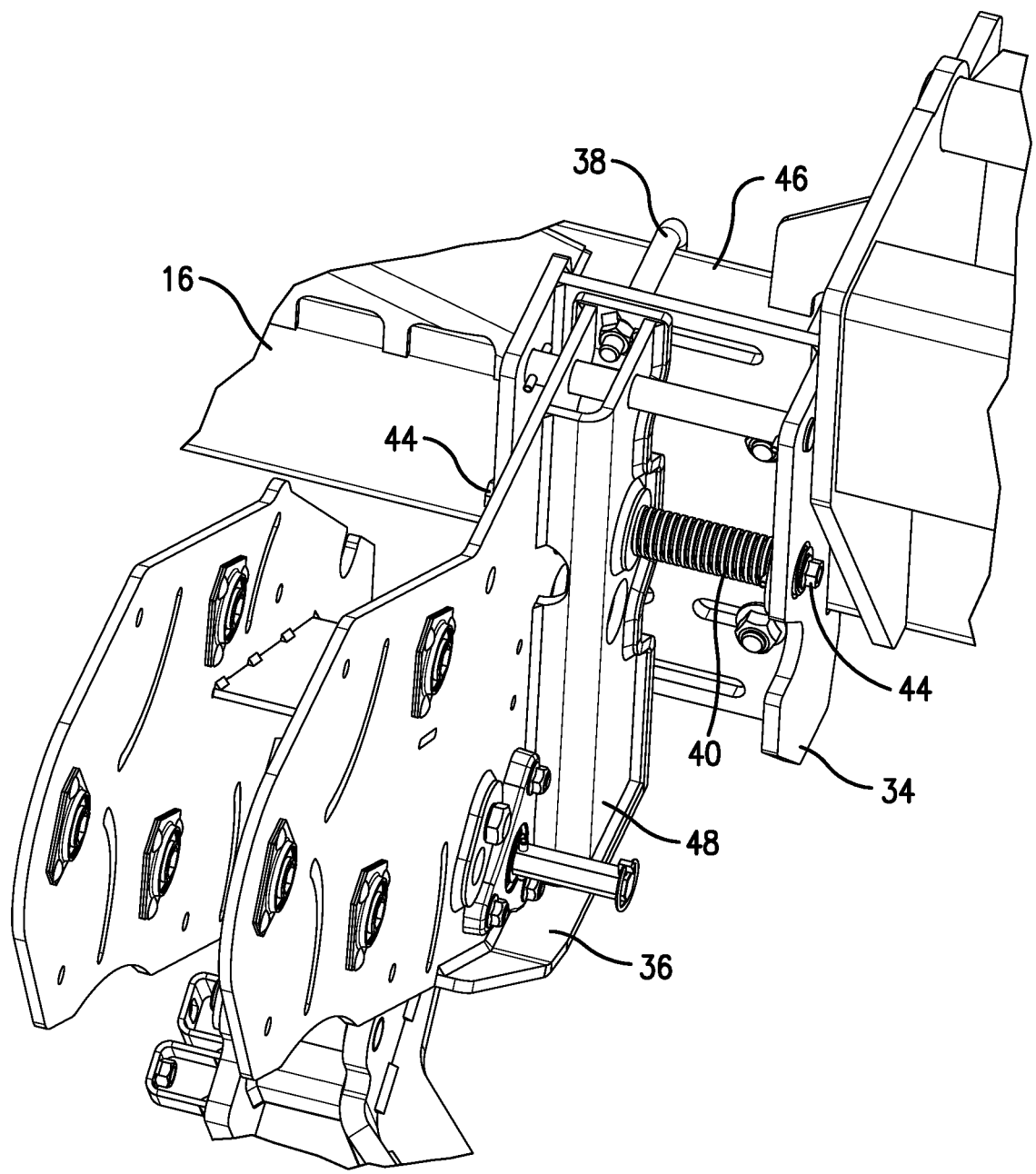
FIG. 12 is another front perspective view of a portion of the wheel assembly from FIG. 11.

In operation, the wheel bracket 36 may be engaged with the base bracket 34 such that the attachment portion 48 of the wheel bracket 36 is initially positioned adjacent to a first side portion of the frame of the base bracket 34, as illustrated in FIGS. 7 and 8. An operator of the planter 10 may rotate the leadscrew 40 (e.g., by turning the heads 44 of the leadscrew 40 via a wrench). Such rotation of the leadscrew 40 will, due to the threaded engagement between the receiver element 50 of the attachment portion 48 and the leadscrew 40, cause the attachment portion 48 to slide along the length of the leadscrew 40 towards a second side portion of the frame of the base bracket 34. The lateral shifting of the attachment portion 48 causes a corresponding lateral shifting of the entirety of the wheel bracket 26 and the wheel 30. The leadscrew 40 may be rotated until the attachment portion 48 is positioned adjacent to the second side portion of the frame of the base bracket 34, as shown in FIGS. 11 and 12. The guide element 46 and its reception with the upper through-hole of the attachment portion 48 provides for support and stability between the wheel bracket 36 and the base bracket 34 as the wheel bracket 36 shifts its position (e.g., laterally) with respect to the base bracket 34.

Although the present description describes how the leadscrew 40 of the base bracket 34 can be rotated so as to shift the position of base bracket 36 (due to the threaded engagement between the leadscrew 40 and the receiver element 50 of the attachment portion 48 of the wheel bracket 36), it should be understood that in other embodiments, the leadscrew 40 may be fixedly secured to the base bracket 34 and the receiver element 50 may be rotatably fixed to the wheel bracket 36 so as to cause the wheel bracket 36 to shift its position with respect to the base bracket 34. Furthermore, although the combination of the leadscrew 40 and the receiver element 50 may be used to laterally shift the wheel bracket 36 (and the thus the wheel 30) with respect to the base bracket 34 (and thus the toolbar 16), it should be understood that other mechanisms may be used to shift the wheel bracket 36 with respect to the base bracket 34, such as hydraulic, pneumatic, electro mechanical actuators (e.g., hydraulic cylinders).

As noted previously, the base bracket 34 is rigidly secured to the toolbar 16 of the main frame 12 of the planter 10. The base bracket 34 may be secured to the toolbar 16 in such a manner that the leadscrew 40 extends generally laterally, i.e., in parallel relation with the toolbar 16. A such, shifting of the attachment portion 48 of the wheel bracket 36 along the leadscrew of the base bracket 34 causes a corresponding lateral shifting of the wheel bracket 36 with respect to the toolbar 16 of the main frame 12 of the planter 10. Furthermore, because the wheel 30 is rigidly secured to the wheel bracket 36 (e.g., via the support arm 52), shifting of the wheel bracket 36 with respect to the toolbar 16 of the main frame 12 of the planter 10 will cause a corresponding lateral shifting of the wheel 30 with respect to the toolbar 16 of the main frame 12 of the planter 10.

The following description is an exemplary method of using the wheel assembly 14 of the present invention in operation with an agricultural implement in the form of the planter 10. Specifically, the method comprises steps for transitioning the planter 10 from a twin row configuration to a single row configuration. As described above, such a planter 10 includes a laterally-extending toolbar 16 with a plurality of pairs of row units 18 positioned along the toolbar 16. The planter 10 additionally comprises one or more wheels 30 for supporting the planter 10 on the ground. Initially, the planter 10 is configured such that the row units 18 are in the twin row configuration. In the twin row configuration, each of the row units 18 from the pairs of row units is configured to deposit seed. In the single row configuration, a first of the row units 18 from each of the pairs of row units 18 is configured as a non-operational row unit 18 that is configured to not deposit seed, and a second of the row units 18 from each of the pairs of row units 18 is configured as an operational row unit 18 configured to deposit seed.

As described previously, in the twin row configuration, each pair of row units 18 will be positioned over a raised bed 20 of a field, such that one row unit 18 from each pair of row units 18 can deposit seed on either side of a pinnacle of the respective bed 20. In addition, the wheels 30 will be in general alignment with the troughs 22 that separate adjacent beds 20. To transition the row units from the twin row configuration to the single row configuration, the method includes the configuring one of the row units 18 from each of the pairs of row units 18 as a non-operational row unit 18. In some embodiments, the non-operational row units 18 will be raised above the ground to a raised position. Next, the toolbar 16 will be laterally shifted. In some embodiments, such a lateral shifting of the toolbar 16 will be with respect to the towing unit (e.g., the tractor), such that the laterally shifted toolbar 16 will be shifted from a centered position to an offset (asymmetric) position relative to the towing unit. In addition, because the pairs of row units 18 are rigidly secured to the toolbar 16, the row units 18 will also be shifted laterally (e.g., be shifted from a centered position to an offset (asymmetric) position relative to the towing unit). In such a configuration, each pair of row units 18 will include a single row unit 18 positioned directly over a raised bed 20 of the field, such that the single row unit 18 can deposit seed on the pinnacle of the respective bed 20.

Upon the lateral shifting of the toolbar 16 and the row units 18, however, the wheels 30 will not likely be in general alignment with the troughs 22 that separate adjacent beds 20. As such, a further step of the method includes laterally shifting the wheels 30 with respect to the toolbar 16. Thereafter, the wheels 30 will be in general alignment with the troughs 22 that separate adjacent beds 20. Embodiments may provide for the wheels 30 to be shifted without removing the wheels 30 and/or the wheel assembly 14 from the toolbar 16. In some additional embodiments, the wheels 30 may be shifted without lifting the toolbar 16. However, in some other embodiments, the toolbar 16 may be at least partially lifted or raised to facilitate the lateral shifting of the wheels 30. It should be understood that the steps provided above may reversed so as to transition the row units 18 from the single row configuration to the twin row configuration.

In certain embodiments, during the method of transitioning the planter 10 from a twin row configuration to a single row configuration (or vice versa), the wheels 30 will be shifted in an opposite lateral direction than the lateral direction in which the toolbar 16 is shifted. For example, as shown in FIG. 5, a directional arrow illustrates the toolbar 16 having been shifted laterally in a right direction (e.g., with respect to the tow vehicle), while another directional arrow illustrates the wheel assembly 14 (including the wheel 30) having been shifted laterally in a left direction (with respect to the toolbar 16). Furthermore, in some embodiments, during the lateral shifting of the wheels 30, the wheels 30 will not be pivoted with respect to the toolbar 16. More specifically, the shifting of the wheels 30 may include only a shifting in a lateral direction with respect to the toolbar 16, not a rotational or angular shifting with respect to the toolbar 16. Furthermore still, during the lateral shifting of the wheels 30, the wheels 30 may remain in contact with the ground. In embodiments in which the wheels 30 remain in contact with the ground during the lateral shifting of the wheels 30, the toolbar 16 may be at least partially lifted away from the ground so as to reduce the weight/load experienced by the wheels 30 so as to decrease the effort necessary to shift the wheels 30 laterally.

As was described previously, the wheels 30 may each be associated with a wheel assembly 14 that comprises a base bracket 34 and a wheel bracket 36. As such, the lateral shifting of the wheels 30 may comprise the wheel bracket 36 laterally shifting with respect to the base bracket 34 which is rigidly coupled to the toolbar 16. Specifically, an operator may rotate the leadscrew 40 of the base bracket 34 so as to laterally shift the wheel bracket 36 (and the wheel 30 secured thereto) with respect to the base bracket 34 and the toolbar 16. In some embodiments, such as shown in FIGS. 1 and 2, the wheel assemblies 14 may comprise gauge wheel assemblies that are configured to raise and lower with respect to the toolbar 16, so as to raise and lower the position of the toolbar 16 and the row units 18 with respect to the ground. However, the wheel assemblies incorporating embodiments of the present invention may include various other types of wheels and/or wheel assemblies that may be used on agricultural implements.

Figure 13:
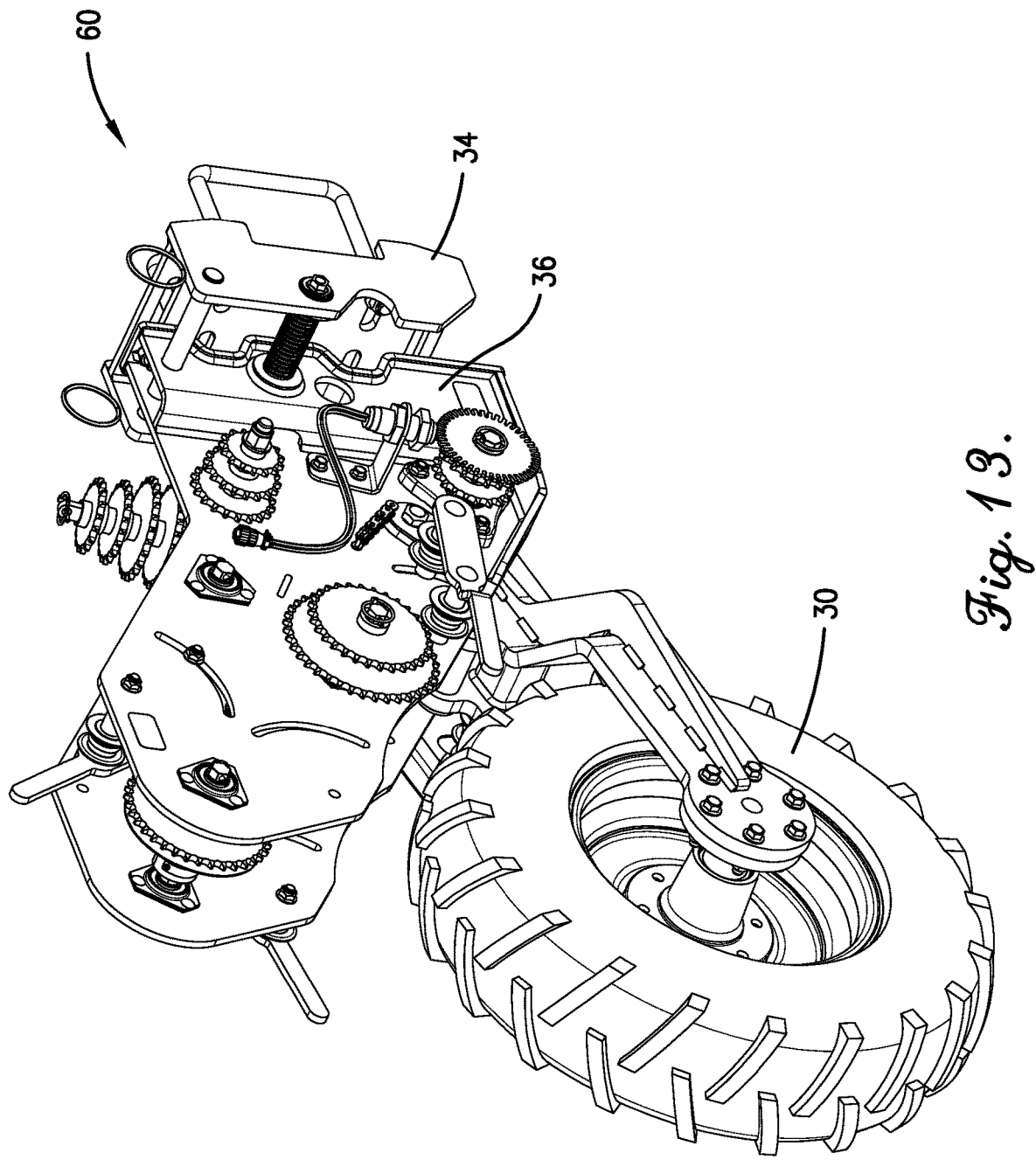
FIG. 13 is a front perspective view of another wheel assembly according to embodiments of the present invention.
Figure 14:
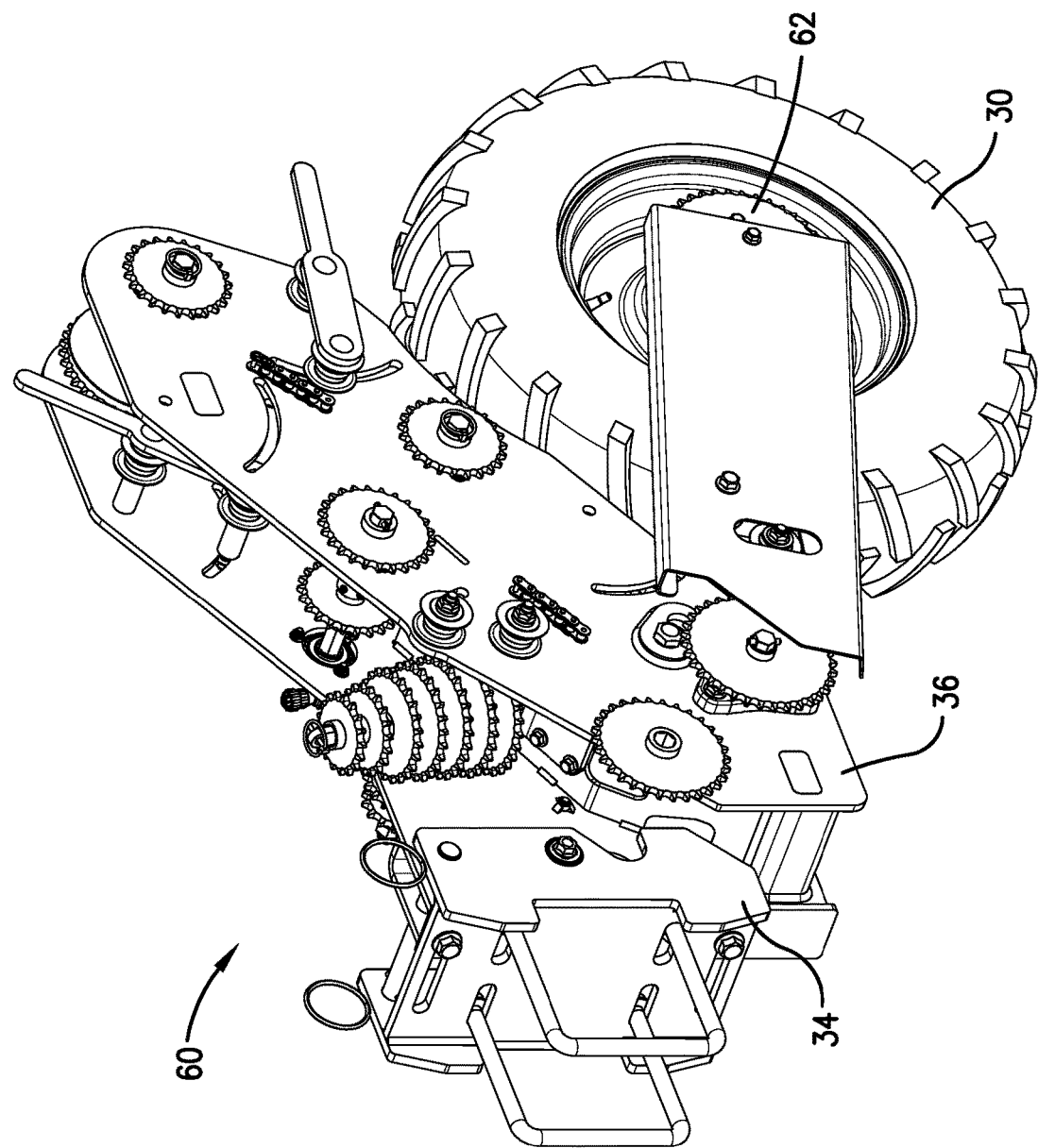
FIG. 14 is a rear perspective view of the wheel assembly from FIG. 13.

For example, in other embodiments, such as shown in FIGS. 13 and 14, embodiments of the present invention may include wheel assemblies 60 in the form of drive-train wheel assemblies. The wheel assemblies 60 may share many of the same features and functionalities of the wheel assemblies 14 described above, such as base bracket 34 configured to be rigidly secured to a toolbar 16 and a wheel bracket 36 configured to be laterally shifted with respect to the base bracket 34 and the toolbar 16. In addition, however, the wheel assembly 60 may include a plurality of gears, sprockets, or other driving mechanisms configured to drive and/or provide power to various components of the planter 10. For example, the wheel assembly 60 may include a plurality of sprockets positioned on the wheel bracket 36 for providing rotary power to seed meters associated with the row units 18. Such sprockets may be powered by the wheel 30 of the wheel assembly 60, and particularly by a drive sprocket 62 associated with the axle of the wheel 30 such that rotation of the wheel 30 and the axle causes a corresponding rotation of the drive sprocket 62. The drive sprocket 62 may be interconnected (e.g., via chains or belts) with the various other sprockets of the wheel assembly 60 so as to cause such other sprockets to rotate.

Having thus described one or more embodiments of the invention, what is claimed as new and desired to be protected by Letters Patent includes the following:

What is claimed is:

1. A wheel assembly for an agricultural implement, wherein the agricultural equipment includes a laterally-extending toolbar with one or more agricultural tools extending from the toolbar, said wheel assembly configured to support the toolbar above the ground and comprising:
   a wheel configured to rotate along a ground surface;
   a base bracket configured to be rigidly secured to the toolbar, wherein said base bracket includes a threaded leadscrew extending between side portions of said base bracket; and
   a wheel bracket adjustably engaged with said base bracket, wherein rotation of said leadscrew is configured to cause said wheel bracket to shift its position along a length of said leadscrew and to thereby cause a corresponding lateral shifting of said wheel with respect to the toolbar.

2. The wheel assembly of claim 1, wherein said base bracket includes a frame and, wherein the threaded leadscrew is secured to said frame.

3. The wheel assembly of claim 2, wherein said leadscrew is secured to said frame via bearings, such that said leadscrew is configured to rotate with respect to said frame.

4. The wheel assembly of claim 3, wherein said wheel bracket includes an attachment portion with internal threads, wherein said wheel bracket is engaged with said base bracket via engagement between said attachment portion and said leadscrew.

5. The wheel assembly of claim 4, wherein rotation of said leadscrew causes said wheel bracket to shift laterally with respect to said base bracket and to the toolbar.

6. The wheel assembly of claim 1, wherein the agricultural implement is a planter and wherein the agricultural tools comprise row units extending down from the toolbar.

7. The wheel assembly of claim 6, wherein the planter is a twin row planter with a plurality of pairs of row units extending down from the toolbar.

8. An agricultural implement comprising:
   a laterally-extending toolbar;
   one or more tools extending from said toolbar; and
   a wheel assembly configured to support the toolbar above the ground and comprising—
      a wheel configured to roll on the ground,
      a base bracket rigidly secured to said toolbar, wherein said base bracket includes a threaded leadscrew extending between side portions of said base bracket,
      a wheel bracket adjustably engaged with said base bracket, wherein rotation of said leadscrew is configured to cause said wheel bracket to shift its position along a length of said leadscrew and to thereby cause a corresponding lateral shifting of said wheel with respect to said toolbar.

9. The agricultural implement of claim 8, wherein said base bracket includes a frame and the threaded leadscrew is secured to said frame, wherein said leadscrew is secured to said frame via bearings, such that said leadscrew is configured to rotate with respect to said frame, wherein said wheel bracket includes an attachment portion with internal threads, wherein said wheel bracket is engaged with said base bracket via engagement of said attachment portion with said leadscrew.

10. The agricultural implement of claim 9, wherein rotation of said leadscrew causes said wheel bracket to shift laterally with respect to said base bracket and to said toolbar.

11. The agricultural implement of claim 8, wherein said agricultural implement is a twin row planter, and wherein said one or more tools comprise a plurality of pairs of row units extending down from the toolbar.

12. The agricultural implement of claim 11, wherein said agricultural implement can be configured in either a twin row configuration or a single row configuration, wherein in the twin row configuration each of the row units from the pairs of row units is configured to deposit seed, wherein in the single row configuration a first of the row units from each of the pairs of row units is configured as a non-operating row unit that is configured to not deposit seed, and a second of the row units from each of the pairs of row units is configured as an operational row unit configured to deposit seed.

\* \* \* \* \*